US012729325B2

(12) United States Patent
Janicki

(10) Patent No.: US 12,729,325 B2
(45) Date of Patent: Sep. 8, 2026

(54) ADHESIVE LABEL

(71) Applicant: UPM Raflatac Oy, Tampere (FI)

(72) Inventor: Bartosz Janicki, Helsinki (FI)

(73) Assignee: UPM RAFLATAC OY, Tampere (FI)

( * ) Notice: Subject to any disclaimer, the term of this patent is extended or adjusted under 35 U.S.C. 154(b) by 114 days.

(21) Appl. No.: 18/565,111

(22) PCT Filed: Jun. 3, 2022

(86) PCT No.: PCT/FI2022/050380
§ 371 (c)(1),
(2) Date: Nov. 29, 2023

(87) PCT Pub. No.: WO2022/254097
PCT Pub. Date: Dec. 8, 2022

(65) Prior Publication Data

US 2024/0368434 A1 Nov. 7, 2024

(30) Foreign Application Priority Data

Jun. 4, 2021 (FI) ..................................... 20215655

(51) Int. Cl.
*C09J 133/08* (2006.01)
*C09J 7/38* (2018.01)

(52) U.S. Cl.
CPC ............ *C09J 7/385* (2018.01); *C09J 133/08* (2013.01); *C09J 2203/334* (2013.01); *C09J 2301/122* (2020.08); *C09J 2301/16* (2020.08); *C09J 2301/208* (2020.08); *C09J 2301/302* (2020.08); *C09J 2301/312* (2020.08); *C09J 2301/408* (2020.08); *C09J 2301/50* (2020.08); *Y10T 428/2848* (2015.01); *Y10T 428/2891* (2015.01)

(58) Field of Classification Search
None
See application file for complete search history.

(56) References Cited

U.S. PATENT DOCUMENTS 5,993,961 A 11/1999 Ugolick et al.
6,586,510 B1 7/2003 Brown et al.
2008/0033095 A1* 2/2008 Takahashi .............. C09J 133/08 524/460
2009/0110861 A1 4/2009 Sherman
2013/0164478 A1 6/2013 Yamamoto et al.
2014/0017467 A1 1/2014 Inao et al.
2014/0220287 A1* 8/2014 Jokinen .................... C09J 7/243 156/497
2021/0155834 A1 5/2021 Gerst et al.
2024/0150625 A1* 5/2024 Janicki ..................... C09J 7/405
2025/0118226 A1* 4/2025 Pirkkanen ................. C08F 8/32

FOREIGN PATENT DOCUMENTS

EP 2803712 A1 11/2014
JP H0745557 A 2/1995
WO 2016065133 A1 4/2016

OTHER PUBLICATIONS

International Search Report and Written Opinion for the corresponding International Application No. PCT/FI2022/050380; Date of Filing: Jun. 3, 2022, Date o Mailing: Aug. 12, 2022; 12 pages.

* cited by examiner

*Primary Examiner* — Anish P Desai
(74) *Attorney, Agent, or Firm* — Nixon Peabody LLP

(57) ABSTRACT

The specification relates to an adhesive label comprising a water-borne multilayer pressure sensitive adhesive with enhanced performance. The adhesive label comprises a face layer and a multilayer adhesive adjoined to the face layer. The multilayer adhesive comprises at least two layers of pressure sensitive adhesive. At least one of the at least two layers comprises a pressure sensitive adhesive composition including at least one acrylic polymer which has a reactive group capable of undergoing a crosslinking reaction, and a crosslinking agent. The specification also relates to a labelled item, a label laminate web and a method for manufacturing an adhesive label.

12 Claims, 3 Drawing Sheets

ADHESIVE LABEL

CROSS-REFERENCE TO RELATED APPLICATIONS

This application is a National Stage application of PCT/FI2022/050380, filed Jun. 3, 2022,which claims benefit of Finnish Patent Application No. 20215655, filed on Jun. 4, 2021, both of which are incorporated by reference herein in their entirety.

TECHNICAL FIELD

This specification relates to an adhesive label. Particularly, it relates to an adhesive label comprising a multilayer pressure sensitive adhesive. Further, this specification relates to a labelled item, a label laminate web and a method for manufacturing an adhesive label.

BACKGROUND

Environmental and health restrictions on emission of organic solvents from industrial processes have driven development of water-borne pressure sensitive adhesives, which are based on colloidally stable aqueous dispersions of polymer particles. However, water-borne pressure sensitive adhesives often suffer limitations in adhesive strength and in their ability to bond to non-polar substrates. Therefore, solutions overcoming these limitations are desired.

SUMMARY

This specification provides an adhesive label comprising a water-borne multilayer pressure sensitive adhesive with enhanced performance. The adhesive used has a high solid content, which enables a more energy efficient, and thus more sustainable overall process in the label manufacturing. The properties, such as the adhesion-cohesion balance, of the adhesive composition and/or the multilayer adhesive are tuneable by adjusting the amount of crosslinking taking place within the adhesive composition and/or the multilayer adhesive. Therefore, multiple application requirements can be met by using the water-borne multilayer pressure sensitive adhesive disclosed herein. The adhesive composition is suitable for use with both natural fibre based and filmic face materials. Further, the composition exhibits good water whitening resistance. Moreover, the adhesive composition can be used at wide temperature range and due to the crosslinking mechanism the adhesive composition exhibits unlimited shelf-life.

According to an embodiment, an adhesive label comprising a face layer and a multilayer adhesive adjoined to the face layer is provided. The multilayer adhesive comprises at least two layers of pressure sensitive adhesive. At least one of the at least two layers comprises a pressure sensitive adhesive composition including at least one acrylic polymer which has a reactive group capable of undergoing a crosslinking reaction, and a crosslinking agent.

According to an embodiment, a labelled item is provided. The labelled item comprises an item and an adhesive label disclosed herein. The adhesive label is attached to a surface of the item via the multilayer adhesive of the adhesive label.

According to an embodiment, a label laminate web is provided. The label laminate web comprises a face, a multilayer adhesive and a release liner. The face is adjoined to the release liner via the multilayer adhesive. The multilayer adhesive comprises at least two layers of pressure sensitive adhesive, and at least one of the at least two layers comprises a pressure sensitive adhesive composition including at least one acrylic polymer which has a reactive group capable of undergoing a crosslinking reaction, and a crosslinking agent.

According to yet another embodiment, a method for manufacturing an adhesive label as disclosed above is provided. The method comprises

- arranging a substrate,
- coating the substrate with pressure sensitive adhesive so as to form a multilayer adhesive comprising at least two layers,
- prior to labelling, cutting the substrate coated with the pressure sensitive adhesive so as to form adhesive labels.

At least one of the at least two layers comprises a pressure sensitive adhesive composition including at least one acrylic polymer which has a reactive group capable of undergoing a crosslinking reaction, and a crosslinking agent.

Figure 1:
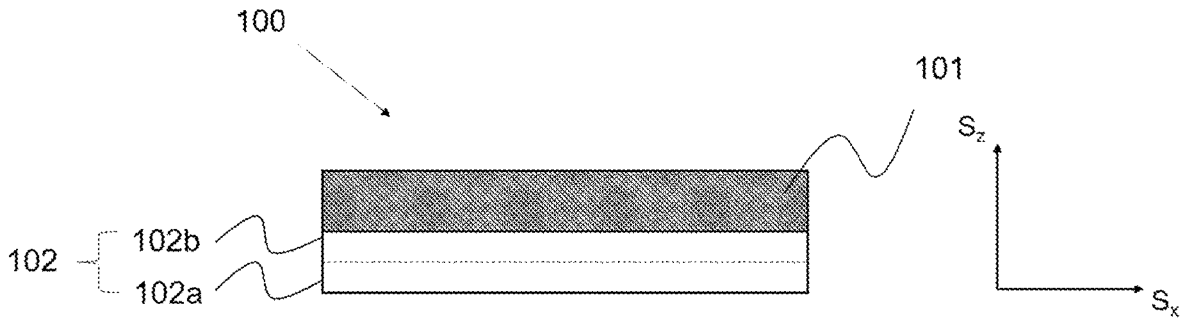
FIG. 1 illustrates, by way of an example, an adhesive label according to an embodiment.

The figures are schematic. The figures are not in any particular scale.

DETAILED DESCRIPTION

The solution is described in the following in more detail with reference to some embodiments, which shall not be regarded as limiting.

In this description and claims, the percentage values relating to an amount of a material are percentages by weight (wt. %) unless otherwise indicated. Term "comprising" may be used as an open term, but it also comprises the closed term "consisting of". Unit of thickness expressed as microns corresponds to μm. Unit of temperature expressed as degrees C. corresponds to ° C. The following reference numbers and denotations are used in this application:

$S_x$, $S_y$, $S_z$ 3D coordinates
100, 200, 300, 400, 500 adhesive label
101, 201, 301, 401, 601 face layer
102, 202, 302, 402, 602 multilayer adhesive
102*a*, 102*b*, 202*a*, 202*b*, 302*a*, 302*b* (adhesive) layer
402*c* barrier coating layer
510 item
520 labelled item
630 label laminate web
640 release liner A label is a piece of material to be applied onto articles or items of different shapes and materials. An article or an item may be a package. A label comprises at least a face material also referred to as a face stock or a face. A typical way to adhere the label onto an article or an item is by use of adhesive. The label comprising an adhesive layer is referred to as an adhesive label. The adhesive may comprise pressure sensitive adhesive (PSA). A label comprising pressure sensitive adhesive may be referred to as a pressure sensitive adhesive label. Pressure sensitive adhesive labels may also be referred to as self-adhesive labels.

The labels comprising PSA can be adhered to most surfaces through an adhesive layer without the use of a secondary agent, such as a solvent, or heat to strengthen the bond. In that case the adhesive is pressure sensitive as such. Alternatively, the adhesive may be activatable in order to be pressure sensitive. The PSA forms a bond when pressure is applied onto the label at ambient temperature (e.g. between 15 and 35 degrees C.) or for cold applications even under freezing temperatures below 0 degrees C. or for hot applications in temperatures above 35 degrees C., adhering the label to the item/article to be labelled. Examples of pressure sensitive adhesives include water-based (water-borne) PSAs, solvent based PSAs and hot-melt PSAs. A label may further comprise other adhesive(s).

Term "face" refers to a top substrate of the label, also called as a face stock, a face material or in case of plastic, i.e. filmic, material a face film. The face may have a monolayer structure or a multilayer structure comprising at least two layers. In case of a plastic material the multilayer filmic structure may be co-extruded or it may comprise several layers laminated together. The face is the layer that is adhered to the surface of an article/item during labelling through an adhesive layer. The face comprises an adhesive side and a print side. A combination comprising a face and adhesive may be referred to as an adhesive label. The face may comprise e.g. print in order to provide information and/or visual effect. Printable face is suitable for printing by any known printing methods, such as with gravure, flexographic process, offset, screen or letterpress. The print may exist on a top surface, reverse side or both top and reverse side of the face. Further, the label may contain additional layers, for example top coatings or overlaminates to protect the top surface and/or print of the label against rubbing or other external stress. Coating or additional layers, such as a primer, may enable enhancing compatibility of adjacent layers or parts of the label, for example adhesion between the layers. A label comprising a face, a print layer and an adhesive may be referred to as a printed label.

Term "release liner" refers to a structure comprising a substrate and a release layer on a surface of the substrate contacting the adhesive in a label laminate. The substrate may also be called a backing material. The release liner may comprise a release agent. The release agent is a chemical having low surface tension. The release agent may be used in order to prevent other materials from bonding to it and to provide a release effect. Release liners of the label laminates may serve one or more useful functions: they may be used as a carrier sheet onto which the adhesive is coated; they may protect the adhesive layer during storage and transportation; they may provide a support for labels during die-cutting and printing, and ultimately they may provide the release substrate carrying the labels for dispensing onto the items/articles to be labelled.

Term "label laminate", also referred to as an adhesive label laminate refers to a product comprising a face, adhesive and a release liner. In the label laminate the face is laminated together with the release liner having the adhesive in between. The label laminate may be a continuous structure from which the individual labels may be die-cut. The release liner of the label laminate is typically removed prior to labelling i.e. attaching the label onto the surface of an item to be labelled.

Individual labels may be cut from the label laminate structure. After cutting, the labels may remain to be attached to a common release liner (the release liner remains uncut). Thus, a plurality of labels may remain to be attached to a common continuous release liner. This may be called a converted label web. Alternatively, the labels may be completely separate (i.e. also the release liner may be cut). A label, including a face and adhesive, may be separated from the release liner e.g. by pulling the release liner in the direction −Sz with respect to the label. Thus, a surface of the adhesive layer is exposed so that said surface can be attached to an article/item.

The label may also be a so-called linerless label. The linerless label comprises a mono- or multilayer face and an adhesive on the face. Alternatively the label may be a so-called shrink label, where the heat shrinkable polymeric face material(s) are seamed and rolled on or sleeved around labelled articles and shrunk around the items. Shrinkable labels may comprise additionally some pressure sensitive adhesive(s) or those may be produced completely without pressure sensitive adhesive, or even without seaming adhesive.

Term "web" refers to a continuous sheet of material. The web is generally processed by moving over rollers. Between processing stages, webs may be stored and transported as rolls.

Term "laminate web" refers to a structure comprising two or more continuous sheets of material attached together into a web format. Typically, the laminate web comprises a face material attached (laminated) onto a release liner via a pressure sensitive adhesive.

Labels may be used in wide variety of labelling applications and end-use areas, such as labelling of food, home and personal care products, industrial products, pharmaceutical and health care products, beverage and wine bottles, other consumables etc. Labels enable providing information, like product specification, on the labelled product(s). Information, e.g. print of a label, may comprise human-readable information, like image(s), logo(s), text, and/or machine-readable information, like bar code(s), QR (Quick Response) code(s). The surface of the labelled article/item may be for example plastics, glass, metal, or paper based. The labelled article/item may be for example a container, such as a bottle, jar, canister, can, tin or the like. The label may also be applied to semi-rigid or flexible packages used for e.g. packaging of food.

This specification aims to provide an adhesive label comprising a water-borne multilayer pressure sensitive adhesive with enhanced performance.

Adhesive Composition

Adhesive composition disclosed herein is water-based, i.e. aqueous or water-borne, polymer emulsion (also called aqueous polymer dispersion). The adhesive composition may also be called a latex. Latex is a stable dispersion (emulsion) of polymer particles in water. Latex solidifies by coalescence of the polymer particles as the water evaporates.

The latex disclosed herein has a high solid content, typically higher than 60%. The adhesive composition disclosed herein may have a solid content of from 60% to 70%, for example 65%. Such water based dispersions with high polymer content are of particular interest since relatively low portion of water has to be removed during drying which translates into lower energy consumption. Development and use of high solid dispersion has positive impact on environment since less material has to be transported and as a result carbon footprint is reduced. Use of a high solid content adhesive in label manufacturing enables a more energy efficient, and thus more sustainable overall process.

There are several methods which allow production of high solid latex at manageable viscosity based on precise control of particle size distribution. This is achieved either by designing broad particle size distribution or by generating particular number of particle populations.

The high solid content adhesive composition may be achieved by controlling the particle size distribution in the polymerization process. As an example, the polymerization process may provide a polymer dispersion having a bimodal or multimodal particle size distribution. An exemplary polymerization process may provide a bimodal polymer dispersion, which comprises 60-80% of total volume particles having a particle size of 500-700 nm and 20-40% of total volume particles having a particle size of 80-200 nm. As an example, the polymer dispersion disclosed herein may be polymerized by using so-called external seed technology. The polymer dispersion disclosed herein may be produced by first providing small particles as seeds and allowing them to grow, thereafter providing more seed particles, and allowing all of the particles to grow together in order to form a polymer dispersion wherein the particles are very well packed in.

Water-based adhesives when compared to solvent-based ones provide better sustainability with less fossil-based raw materials and less volatiles involved both during the manufacturing and during end use.

The adhesive composition comprises at least one acrylic polymer. The at least one acrylic polymer comprises a reactive group capable of undergoing a crosslinking reaction. The adhesive composition further comprises a crosslinking agent.

The at least one acrylic polymer may be a polymerization product of acrylic monomer(s) and non-acrylic comonomer (s).

Examples of acrylic monomers include esters of prop-2-enoic acid (acrylic acid, AA) and 2-methylprop-2-enoic acid with methanol (methyl methacrylate, MMA), ethanol, propan-1-ol or propan-2-ol, esters of prop-2-enoic acid or 2-methylprop-2-enoic acid with butan-1-ol, 2-methylpropan-1-ol, butan-2-ol, 2-methylpropan-2-ol, pentan-1-ol, 3-methylbutan-1-ol, 2,2-dimethylpropan-1-ol, hexano-1-ol, heptan-1-ol, octan-1-ol, 2-ethylhexan-1-ol, 6-methylheptan-1-ol, nonan-1-ol, 7-methyloctan-1-ol, dodecan-1-ol, 8-methylnonan-1-ol, undecane-1-ol or dodecan-1-ol, alkyl (meth) acrylate, aliphatic/alicyclic esters of prop-2-enoic acid or 2-methylprop-2-enoic acid with trideca-1-ol, tetradecan-1-ol, pentadecan-1-ol, hexaden-1-ol, octadecan-1-ol, cyclohexanol, (1S,2S,4S)-1,7,7-trimethylbicyclo[2.2.1]heptan-2-ol and the other isomers thereof as well as diesters of prop-2-enoic acid and 2-methylprop-2-enoic acid with diols such as ethane-1,2-diol, propane-1,2-diol, propane-1,3-diol, butane-1,3-diol, butane-1,4-diol, and also 1,2-bis(ethenyl) benzene, ethenyl 2-methylprop-2-enoate, prop-2-enyl 2-methylprop-2-enoate, prop-2-enyl prop-2-enoate, bis (prop-2-enyl) (Z)-but-2-enedioate, bis(prop-2-enyl) (E)-but-2-enedioate, N-[(prop-2-enoylamino)methyl]prop-2-enamide.

Preferred monomers for production of PSA may comprise butyl prop-2-enoate (butyl acrylate, BA), 2-ethylhexyl prop-2-enoate and 6-methylheptyl prop-2-enoate and their mixtures. Monomer composition may comprise up to 99% of these particular monomers or their mixture. Typically up to 90% but not less than 50% of preferred monomers may be comprised by the monomer composition, providing that final glass transition temperature of resulting polymer measured by Differential Scanning calorimetry (DSC) according to ISO 11357-2 is below 20 degrees C. and even more preferably below −10 degrees C. and most preferably below −30 degrees C.

Vinyl monomers such as styrene, prop-1-en-2-ylbenzene (alpha-methylstyrene), or vinyltoluenes, vinyl esters of neoalkanoic acids, and particularly ethenyl acetate (vinyl acetate, Vac) may be used as non-acrylic comonomers. VAc undergoes hydrolytic degradation and may be obtained from renewable resources.

Other useful monomers comprising an amide group may be selected for example from prop-2-enamide, 2-methylprop-2-enamide, 1-ethenylpyrrolidin-2-one, N,N-dimethylprop-2-enamide, N,N,2-trimethylprop-2-enamide. Suitable monomers improving stability of particles may include ethenesulfonic acid, 2-methyl-2-(prop-2-enoylamino)propane-1-sulfonic acid, 4-ethenylbenzenesulfonic acid and their water-soluble salts.

The reactive group capable of undergoing a crosslinking reaction of the at least one acrylic polymer may be selected from the following: epoxy, hydroxyl, ketone, aldehyde, carboxyl. Thus, the at least one acrylic polymer may be a polymerization product of acrylic monomer(s) and non-acrylic comonomer(s), wherein at least one acrylic monomer or non-acrylic comonomer comprises a reactive group capable of undergoing a crosslinking reaction, which reactive group is selected from the following: epoxy, hydroxyl, ketone, aldehyde, carboxyl. The amount of acrylic monomer (s) and/or non-acrylic comonomer(s) comprising a reactive group capable of undergoing a crosslinking reaction may be for example 1-3 wt. %, typically not more than 5 wt. % and not less than 0.1 wt. % of the monomer composition.

Carboxyl functionality as the reactive group may be introduced into polymer chain by copolymerisation with unsaturated acids such as prop-2-enoic acid and 2-methylprop-2-enoic acid, 2-methylidenebutanedioic acid, (2Z)-but-2-enedioic acid, (2Z)-but-2-enedioic acid, (2E)-but-2-enoic acid, methacrylic acid, 2-carboxyethyl acrylate.

Another useful functionality in crosslinking is hydroxyl group. It may be introduced into polymer chain in copolymerisation of monomers such as 2-hydroxyethyl 2-methylprop-2-enoate, 2-hydroxyethyl prop-2-enoate, 3-hydro-xypropyl prop-2-enoate and isomers, 3-hydroxypropyl 2-methylprop-2-enoate and isomers, 4-hydroxybutyl prop-2-enoate and isomers, 4-hydroxybutyl 2-methylprop-2-enoate and isomers, and higher homologues. Also the adducts of hydroxy-functional monomers with ethylene or propylene oxide can be used.

Examples of acrylic monomers comprising a ketone group as the reactive group capable of undergoing a crosslinking reaction include N-(2-methyl-4-oxopentan-2-yl) prop-2-enamide (diacetone acrylamide, DAAM) and 2-(2-methylprop-2-enoyloxy)ethyl 3-oxobutanoate (acetoacetoxy ethyl methacrylate, AAEM).

The crosslinking agent, i.e. a crosslinker or a crosslinking reagent, is a chemical entity that is capable of linking one polymer chain to another. Thus, within context of this specification, the crosslinking agent is capable of linking one acrylic polymer chain to another. In crosslinking a chemical reaction between the polymer chain(s) and the crosslinking agent takes place and a crosslink is formed.

Carboxyl functionality is capable of undergoing crosslinking reaction with following exemplary crosslinking agents: carbodiimides, aziridines, chelating agents like zirconium compounds.

Crosslinking agents capable of reacting with ketone groups include for example crosslinkers with dihydrazide functionality or diamino acid such as lysine. Dihydrazides are formed by a reaction of an organic acid with hydrazine. Hexanedihydrazide (adipic dihydrazide, ADH) is an example of a suitable crosslinking agent with dihydrazide functionality. Other useful crosslinkers may be selected from group of aliphatic diamines or polyether amines. Crosslinkers containing amine functionality are also capable of reacting with epoxy groups introduced into polymer by copolymerisation with oxiran-2-ylmethyl 2-methyl-prop-2-enoate (glycidyl methacrylate, GMA). An example of a crosslinking agent capable of reacting with hydroxyl functionality is water-dispersible polyisocyanate.

The crosslinking agent of the adhesive composition disclosed herein is capable of reacting with the reactive group of the at least one acrylic polymer, thus forming a crosslink.

By adjusting the amount of the crosslinking agent, the properties such as the adhesion-cohesion balance of the adhesive composition may be tuned. Thus, multiple application requirements can be met by adjusting the amount of the crosslinking agent and thus the amount of the crosslinking taking place within the adhesive composition. The lesser the amount of crosslinking agent used, the higher the adhesion of the adhesive composition. The higher the amount of the crosslinking agent used, the higher the cohesion of the adhesive composition.

By using less crosslinking agent, such as 0-20% of the amount of the reactive groups capable of undergoing a crosslinking reaction, permanent adhesion properties may be obtained. When the amount of the crosslinking agent is adjusted to be for example 20-70% of the amount of the reactive groups capable of undergoing a crosslinking reaction, an adhesive with semi-permanent or semi-removable adhesion properties may be obtained. In order to provide a removable or even ultra-removable adhesive composition, the amount of the crosslinking agent may be adjusted to be for example 70-100% of the amount of the reactive groups capable of undergoing a crosslinking reaction. It is also possible to adjust the amount of the crosslinking agent to be more than 100%, for example 100-150% of the amount of the reactive groups capable of undergoing a crosslinking reaction. In that case the adhesive composition will contain polymer chains grafted with the crosslinking agent. Thus, the polymer chains contain branches with crosslinking functionality.

For providing the pressure sensitive adhesive composition, the aqueous polymer emulsion may be formulated by adding at least one of a neutralizing agent, a wetting agent, a biocide, a defoamer, a rheology modifier.

The adhesive composition disclosed herein is suitable for use with both natural fibre based and filmic face materials. Further, the composition exhibits good water whitening resistance. Water whitening refers to loss of optical transparency due to the absorption of water causing the adhesive to become translucent or opaque, when exposed to moisture or water, for example when being immersed in water. The pressure sensitive adhesive composition disclosed herein has water whitening resistance being able to maintain the clarity also when exposed to moist or humid conditions. Water whitening resistance of the adhesive layer is beneficial in achieving transparent 'no label' look appearance of the label and the label being suitable, for example, in applications where the object(s) beneath the label should be visible through the label. Moreover, the adhesive composition can be used at wide temperature range. Wide temperature range may cover a range from minus degrees C. to even over 50 degrees C. Due to the crosslinking mechanism the adhesive composition disclosed herein exhibits unlimited shelf-life.

Multilayer Adhesive

The adhesive composition disclosed above is used for providing a multilayer adhesive of an adhesive label. The multilayer adhesive comprises at least two adhesive layers.

Layers of the multilayer adhesive may vary in thickness and composition. The adhesive properties and/or performance may be adjusted by adjusting the thickness and/or the composition of the layers.

The multilayer adhesive may comprise or consist of two layers of adhesive composition. Both of the two layers may have the adhesive composition as disclosed above, i.e. a water-based adhesive composition comprising a crosslinking agent and at least one acrylic polymer, the at least one acrylic polymer comprising a reactive group capable of undergoing a crosslinking reaction. Thus, both of the layers may be crosslinked.

Alternatively, the two layers may have different adhesive composition. One of the layers may contain the adhesive composition as disclosed above. Thus one of the layers may be crosslinked. The other one of the layers may have the water-based adhesive composition comprising at least one acrylic polymer, the at least one acrylic polymer comprising a reactive group capable of undergoing a crosslinking reaction. However, said water-based adhesive composition itself does not comprise a crosslinking agent.

In case the multilayer adhesive comprises more than two layers of adhesive composition, all of the layers may contain the adhesive composition as disclosed above. Alternatively, the multilayer adhesive may comprise layer(s) having different adhesive composition. In any case, at least one of the layers has the adhesive composition as disclosed above, i.e. a water-based adhesive composition comprising a crosslinking agent and at least one acrylic polymer, the at least one acrylic polymer comprising a reactive group capable of undergoing a crosslinking reaction.

In an example, a multilayer adhesive comprising at least two adhesive layers preferably has the same monomer composition in all of the adhesive layers. However, as already discussed above, it is not necessary for all the adhesive layers to have a crosslinking agent. Thus, the distinct adhesive layers of the multilayer adhesive differ only with respect to the presence of the crosslinking agent.

Layers of the multilayer adhesive may be chemically connected by an interface of the layers. Some crosslinker may migrate to the other layer, thus forming a gradient at the interface of the layers. By this way multilayer's one layer is connected to the other. For example in a multilayer adhesive consisting of two layers, wherein originally only one of the layers contains crosslinking agent, some of the crosslinking agent of the layer containing it may migrate to the other layer, thus causing some crosslinking to take place at the interface of the layers and presumably also in the layer that originally did not include crosslinking agent. In final product, i.e. in the adhesive label the layers of the multilayer adhesive are indistinguishable and integrated.

As mentioned above, the adhesion properties and/or performance of the multilayer adhesive may be adjusted by adjusting thickness and/or composition of the layers. The adhesion properties include shear resistance, which may be used as an indicator of the adhesive's cohesion, as well as peel adhesion and tack, which are indicators of the adhesive's adhesion.

Shear resistance refers to a measure of an adhesive's vertical holding power, i.e. internal cohesive strength (cohesion) of the adhesive. It is generally measured by arranging a specific surface area of adhesive to a substrate, attaching a known weight to the adhesive and the substrate, and then measuring the time the adhesive would hold the weight. Shear resistance may be measured according to FINAT Test Method No. 8 (FTM 8). A low-shear adhesive (soft) has more of a tendency to flow resulting in higher initial tack. However, low-shear adhesive may have a higher chance of the adhesive being split under stress. A high-shear adhesive (firm) is less likely to split under stress due to its higher internal cohesive strength. The high-shear adhesive may have reduced tendency to flow and thus may have lower initial tack.

Peel adhesion refers to a measure of the adhesive's ability to wet out a surface of a substrate and subsequently adhere to the substrate. Peel adhesion thus may quantify the permanence of the adhesion or peel ability of the adhesive. Peel adhesion is defined as the force required to remove adhesive coated material from a standard test plate after a certain dwell time at an angle of 90 degrees or 180 degrees and specified speed. Peel adhesion thus refers to final adhesion. Peel adhesion may be measured according to FINAT Test Method No. 1 or 2 (FTM 1, FTM 2).

According to an embodiment, the multilayer adhesive has a peel adhesion on cardboard in a range of from 0.1 to 7 N/25 mm and/or on glass in a range of from 2 to 9 N/25 mm, when measured according to FTM 1 or FTM 2.

Tack refers to an adhesive's holding power (adhesion) upon contact with a substrate. An adhesive with high initial tack will grab the substrate quickly. An adhesive with low initial tack will exhibit a low level of adhesion when applied. Tack can be measured by loop tack measurement according to FINAT Test Method No. 9 (FTM 9). The loop tack value of the adhesive is expressed as the force required to separate, at specified speed, a loop of material brought into contact with a specified area of a standard surface.

According to an embodiment, the multilayer adhesive has a tack on cardboard in a range of from 1 to 7 N/25 mm and/or on glass in a range of from 5 to 13 N/25 mm, when measured according to FTM 9.

Optionally, the layers of the multilayer adhesive may have a barrier coating layer arranged between said layers. The barrier coating layer may have adhesive properties, but it doesn't need to have said properties. The barrier coating layer preferably comprises reactive groups capable of undergoing crosslinking. In that case also the barrier coating layer may undergo crosslinking with the crosslinking agent contained by at least one of the adhesive layers of the multilayer adhesive.

Adhesive Label

FIG. 1 illustrates a side view in the $S_x$, $S_z$-plane of an adhesive label 100 according to this disclosure. The adhesive label 100 comprises a face layer 101 and a multilayer adhesive 102 adjoined to the face layer. The face layer 101 may comprise or consist of natural fibre based material such as paper or plastic material.

The multilayer adhesive 102 comprises at least two layers 102*a*, 102*b* of pressure sensitive adhesive. At least one of the layers 102*a*, 102*b* comprises the pressure sensitive adhesive composition as described above. Thus, at least one of the layers 102*a*, 102*b* comprises water-based pressure sensitive adhesive composition that includes a crosslinking agent and at least one acrylic polymer which has a reactive group capable of undergoing a crosslinking reaction with said crosslinking agent.

The at least two layers 102*a*, 102*b* forming the multilayer adhesive 102 may be provided such that the multilayer adhesive 102 of the adhesive label 100 comprises from 0.1 to 100%, preferably from 10 to 90%, more preferably from 20 to 80%, even more preferably from 30 to 70% pressure sensitive adhesive that comprises stoichiometric amount of crosslinking agent. Pressure sensitive adhesive that comprises stoichiometric amount of crosslinking agent may be 100% crosslinked. Stoichiometric amount of crosslinking agent means that the adhesive contains a crosslinking agent available for every reactive group capable of undergoing a crosslinking reaction. In 100% crosslinked pressure sensitive adhesive all of the reactive groups capable of undergoing a crosslinking reaction have undergone the crosslinking reaction, i.e. have undergone a reaction with the crosslinking agent.

Figure 2:
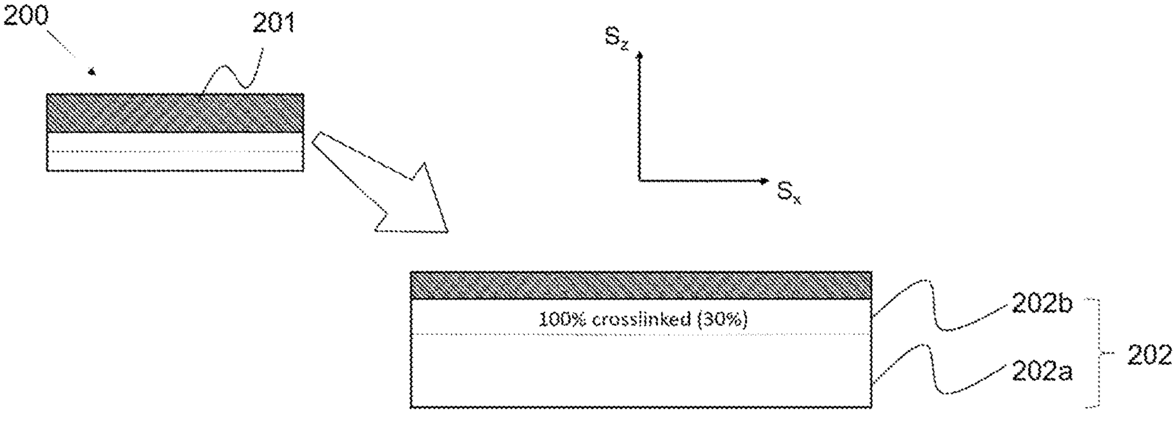
FIG. 2 illustrates, by way of an example, an adhesive label according to an embodiment.

FIG. 2 illustrates an exemplary embodiment, wherein the multilayer adhesive 202 of the adhesive label 200 comprises two layers 202*a*, 202*b* of pressure sensitive adhesive. The layers 202*a*, 202*b* are provided such that the multilayer adhesive 202 comprises 30% of pressure sensitive adhesive that comprises stoichiometric amount of crosslinking agent.

Figure 3:
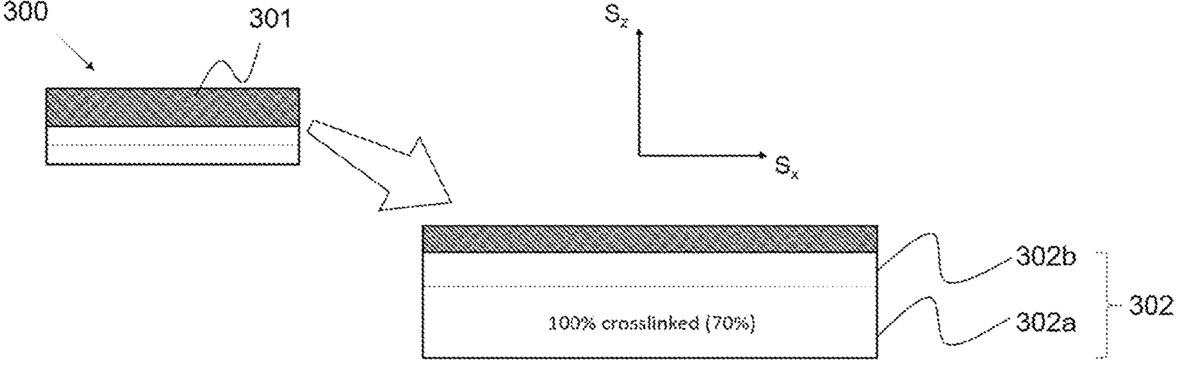
FIG. 3 illustrates, by way of an example, an adhesive label according to an embodiment.

FIG. 3 illustrates an exemplary embodiment, wherein the multilayer adhesive 302 of the adhesive label 300 comprises two layers 302*a*, 302*b* of pressure sensitive adhesive. The layers 302*a*, 302*b* are provided such that the multilayer adhesive 302 comprises 70% of pressure sensitive adhesive that comprises stoichiometric amount of crosslinking agent.

The adhesion properties of the adhesive label disclosed herein may be tuned by altering the location of the crosslinked pressure sensitive adhesive in the multilayer adhesive. If high cohesion is required, the crosslinked proportion of the multilayer adhesive may be located next to the face layer. In case low adhesion is desired, the crosslinked proportion of the multilayer adhesive may be located at the outer side of the adhesive, i.e. next to the substrate to be labelled.

Figure 4:
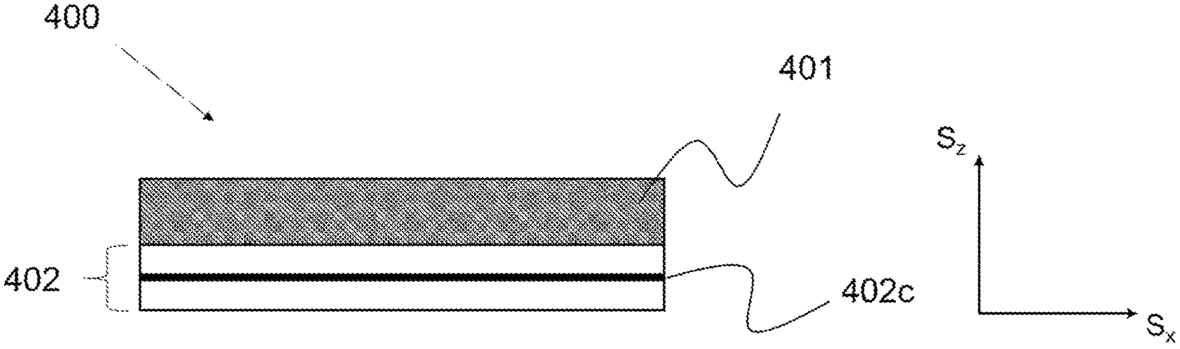
FIG. 4 illustrates, by way of an example, an adhesive label according to an embodiment.

The adhesive label 400 may comprise a barrier coating layer 402*c* arranged as part of the multilayer adhesive 402, as illustrated in FIG. 4. The barrier coating layer 402*c* may be arranged between the layers of the multilayer adhesive. The barrier coating layer 402*c* may provide the effect of preventing migration of undesired substances, such as plasticizer from the face material to the labelled substrate.

Figure 5:
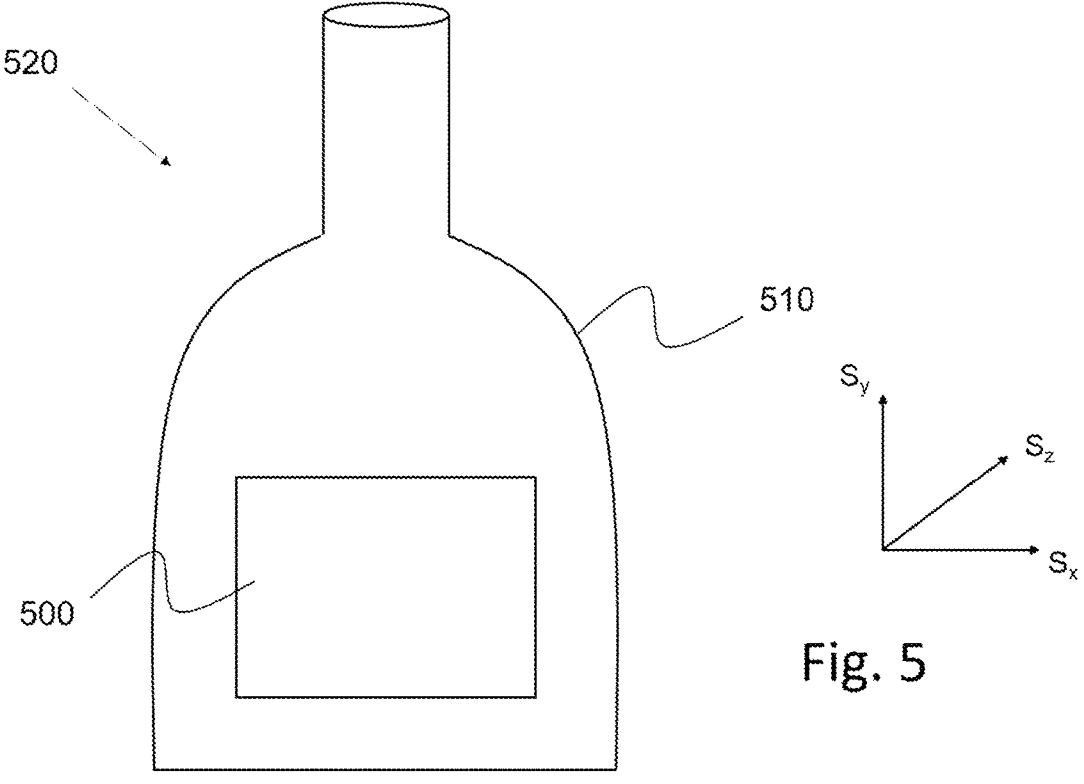
FIG. 5 illustrates, by way of an example, a labelled item according to an embodiment.

The adhesive label disclosed herein may be used for providing a labelled item, as is illustrated in FIG. 5. The labelled item 520 comprises an item 510 and an adhesive label 500 disclosed above. The adhesive label 500 is attached to a surface of the item 510 via the multilayer adhesive of the adhesive label 500. The item 510 may be for example a beverage bottle.

Figure 6:
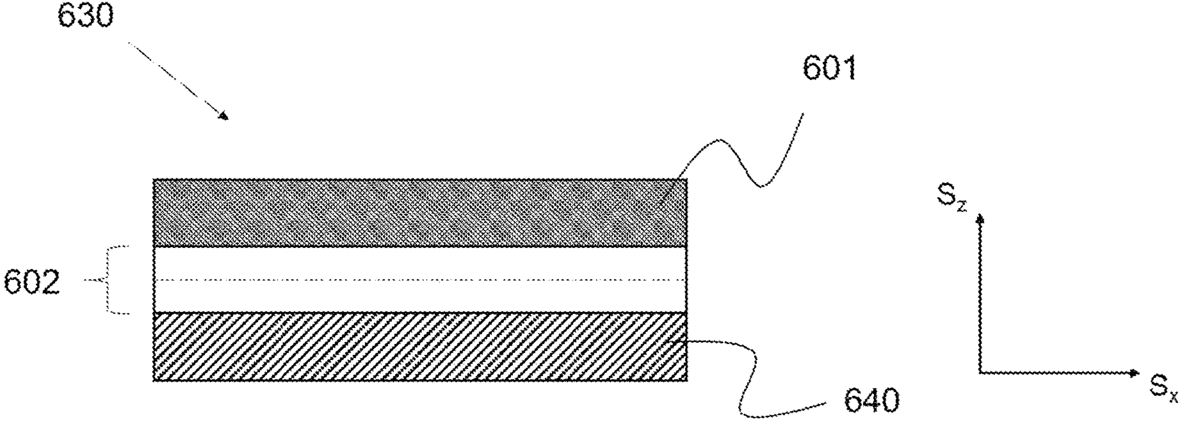
FIG. 6 illustrates, by way of an example, a label laminate web according to an embodiment.

A label laminate web as illustrated in FIG. 6 may be provided for providing the adhesive labels as disclosed herein. The label laminate web 630 comprises a face 601, a multilayer adhesive 602 and a release liner 640. The face 601 is adjoined to the release liner 640 via the multilayer adhesive 602. Details of the multilayer adhesive are discussed above.

The label laminate web 630 may be die-cut in order to form a converted label web. The converted label web comprises the release liner with the adhesive labels disclosed herein attached onto it.

An adhesive label may be manufactured by arranging a substrate and coating the substrate with pressure sensitive adhesive so as to form a multilayer adhesive comprising at least two layers, as disclosed herein. Prior to labelling, the substrate coated with the pressure sensitive adhesive is cut so as to form adhesive labels. For linerless labels, the substrate is a face layer.

In order to produce an adhesive label from a label laminate, the substrate may be a face layer or a release liner. The manufacturing method comprises laminating the release liner together with the face layer in such a way that the multilayer adhesive is arranged in between the face layer and the release liner so as to form a label laminate web. The method comprises die-cutting the label laminate web so as to form a converted label web. The converted label web comprises the release liner with the adhesive labels attached onto it.

EXAMPLES

An adhesive with low cohesion and high adhesion was prepared as described below.

Preparation of Seed

Monomer premix was prepared by homogenising 3.9 g of AA and 260.0 g of BA in 4% deionised water solution of dodecyl benzene sulfonate sodium salt in a glass vessel. Initiator solution was prepared by dissolving 1.0 g of ammonium persulfate in 17.0 g of deionised water in a glass vessel. 1 L jacketed reactor equipped with anchor type agitator and reflux condenser was filled up with 462.8 of 0.8% water solution of sodium dodecyl benzene sulfonate and heated to 80 degrees C. Next, 17% of premix was added into reactor and subsequently 70% of initiator solution was fed within 5 minutes. 15 minutes later, remaining quantity of premix was fed in at constant feeding speed and 45 minutes after first portion of initiator solution the remaining part was also fed in so that all feeds were completed after 135 minutes. Batch was held for an additional hour at reaction temperature and then cooled down and discharged. pH of final product was adjusted to 8 with ammonia.

Volume average particle size of seed measured by laser diffraction technique was 68 nm.

Preparation of Polymer Dispersion

Monomer premix was prepared by homogenising 1210.0 g of BA, 80 g of MMA, 7.0 g of AA, 13.5 g of DAAM and 1.4 g of t-dodecyl mercaptane in 198 g of solution prepared of 175 g of deionised water, 5.0 g of sodium dodecyl benzene sulfonate and 18,0 g of sodium lauryl ether sulphate with level of ethoxylation 30 in a glass vessel. 93.0 g of 4.8% initiator solution was prepared by dissolving ammonium persulfate in deionised water. Next, 2 L jacketed reactor equipped with reflux condenser and anchor type agitator was filled with 309.0 g of water, 2.2g of sodium bicarbonate, 10.0 g of seed and heated to 81 degrees C. Then, ⅓ of initiator solution was introduced into reactor and after 5 min premix and remaining part of initiator were fed at feeding rates shown in Table 1.

TABLE 1

| | Premix [g/min] | Initiator [g/min] | Time [min] |
|---|---|---|---|
| Stage 1 | 2.0 | 0.21 | 30 |
| Stage 2 | 3.8 | 0.21 | 30 |
| Stage 3 | 5.8 | 0.21 | 240 |

After 180 minutes from the beginning of feeding, second portion of seed was fed within 10 min into the reactor.

After all feeds were completed batch was held for 1 h at reaction temperature. In the next phase the temperature was decreased to 60 degrees C. and redox treatment took place. 1.8 g of 70% solution of t-butyl hydroperoxide diluted in 11.8 g of water was introduced to the reactor, followed by 1.8 g of sodium formaldehyde sulfoxylate dissolved in 11.8 g of water fed within 20 minutes. After additional 40 minutes batch that had been cooled down was discharged.

Final product had Brookfield viscosity of 260 cP measured at 100 rpm with spindle L3, solid content of 65% and pH of 4.7. Volume average particle size measured by laser diffraction technique was 473 nm.

Adhesive labels differing with respect to the multilayer adhesive were prepared and studied in order to investigate the effect of the multilayer adhesive composition on the adhesion properties of the labels. Low cohesion and high tack water-based acrylic PSA prepared as shown above was used in following examples. A bifunctional crosslinker was used at stoichiometric ratio to crosslinkable groups in the polymer. The adhesive was coated using transfer coating technique on a siliconized release liner using multipurpose coating laboratory machine, dried in oven at 110 degrees C. for 1 min and then laminated with paper face material. In order to achieve multilayer structure two coating applicators with adjustable metering bar were placed one after the other and pushed at the same time by multipurpose coater. The height of bar of each applicator was adjusted to provide desired thickness of each layer. Details of the exemplary samples are disclosed below. Adhesion properties of the exemplary samples are shown in Table 2.

Comparative Example

As a comparative example, an adhesive label with a multilayer adhesive composed of two layers of pressure sensitive adhesive composition was provided. Both of the layers were composed of a same pressure sensitive adhesive composition that included at least one acrylic polymer having a reactive group capable of undergoing a crosslinking reaction. However, the adhesive composition did not include a crosslinking agent.

Example 1

Example 1 was an adhesive label with a multilayer adhesive composed of two layers of pressure sensitive adhesive composition. The two layers were provided such that the multilayer adhesive comprised 30% of pressure sensitive adhesive that comprises stoichiometric amount of crosslinking agent.

Example 2

Example 2 was an adhesive label with a multilayer adhesive composed of two layers of pressure sensitive adhesive composition. The two layers were provided such that the multilayer adhesive comprised 70% of pressure sensitive adhesive that comprises stoichiometric amount of crosslinking agent.

Example 3

Example 3 was an adhesive label with a multilayer adhesive composed of two layers of pressure sensitive adhesive composition. The two layers were provided such that the multilayer adhesive comprised 100% of pressure sensitive adhesive that comprises stoichiometric amount of crosslinking agent.

TABLE 2

| | Comparative example | Example 1 | Example 2 | Example 3 |
|---|---|---|---|---|
| Tack, cardboard (N/25 mm) | 9.3 | 6.4 | 4.3 | 1.2 |
| Tack, glass (N/25 mm) | 17.8 | 12.2 | 9.6 | 7.5 |
| Peel, cardboard (N/25 mm) | 12.3 | 6.2 | 1.4 | 0.5 |
| Peel, glass (N/25 mm) | 10.9 | 8.3 | 3.0 | 2.6 |
| Shear (min) | 29 | >10000 | >10000 | >10000 |

The results disclosed in Table 2 show that the comparative example having the multilayer adhesive composed of two layers of pressure sensitive adhesive including at least one acrylic polymer having a reactive group capable of undergoing a crosslinking reaction, but not including a crosslinking agent, shows very good tack and peel values, i.e. very good adhesion. However, the multilayer adhesive of the comparative example shows rather low shear, i.e. the adhesive has low cohesion.

Excellent shear values can be achieved when 30% or more of the multilayer adhesive of is pressure sensitive adhesive that comprises stoichiometric amount of crosslinking agent. Table 2 clearly shows that increasing the amount of the 100% crosslinked pressure sensitive adhesive composition in the multilayer adhesive causes decrease in the peel adhesion and tack values. However, example 1 having 30% of the multilayer adhesive comprising stoichiometric amount of crosslinking agent still shows good peel adhesion and tack values. Also for example 2 having 70% of the multilayer adhesive comprising stoichiometric amount of crosslinking agent the tack values are rather good. The peel adhesion values of example 2, for one, are significantly reduced by the increase in the crosslinked portion of the multilayer adhesive. Besides excellent shear, the multilayer adhesive of example 3 comprising stoichiometric amount of crosslinking agent shows rather comparable tack and peel adhesion values on glass when compared to example 2. However, on cardboard the values are significantly lower.

The invention claimed is:

1. An adhesive label comprising:

a face layer; and a multilayer adhesive adjoined to the face layer, the multilayer adhesive comprising at least two layers of pressure sensitive adhesive, the multilayer adhesive having a tack on cardboard in a range of from 1 to 7 N/25 mm and/or on glass in a range of from 5 to 13 N/25 mm, when measured according to FTM 9, wherein at least one of the at least two layers comprises a pressure sensitive adhesive composition including at least one acrylic polymer which has a reactive group capable of undergoing a crosslinking reaction, and a crosslinking agent, and wherein the reactive group capable of undergoing a crosslinking reaction is a ketone and the crosslinking agent is a crosslinker with dihydrazide or diamino acid functionality, wherein the interfaces of the at least two layers of the multilayer adhesive are indistinguishable.

2. The adhesive label according to claim 1, wherein the at least one acrylic polymer comprises N-(2-methyl-4-oxopentan-2-yl)prop-2-enamide or 2-(2-methylprop-2-enoyloxy) ethyl 3-oxobutanoate as an acrylic monomer.

3. The adhesive label according to claim 1, wherein the pressure sensitive adhesive composition has a solid content of higher than 60%.

4. The adhesive label according to claim 1, wherein all of the at least two layers comprise the pressure sensitive adhesive composition including at least one acrylic polymer which has a reactive group capable of undergoing a crosslinking reaction and a crosslinking agent.

5. The adhesive label according to claim 1, wherein the adhesive label further comprises a barrier coating layer arranged as part of the multilayer adhesive.

6. The adhesive label according to claim 1, wherein the multilayer adhesive comprises from 0.1 to 100% pressure sensitive adhesive that comprises stoichiometric amount of the crosslinking agent.

7. The adhesive label according to claim 1, wherein the multilayer adhesive comprises from 30 to 70% pressure sensitive adhesive that comprises stoichiometric amount of the crosslinking agent.

8. The adhesive label according to claim 1, wherein the multilayer adhesive has a peel adhesion on cardboard in a range of from 0.1 to 7 N/25 mm and/or on glass in a range of from 2 to 9 N/25 mm, when measured according to FTM 1 or FTM 2.

9. A labelled item comprising an item and an adhesive label according to claim 1, wherein the adhesive label is attached to a surface of the item via the multilayer adhesive of the adhesive label.

10. A label laminate web comprising:

a face;

a multilayer adhesive; and a release liner, the face being adjoined to the release liner via the multilayer adhesive, wherein the multilayer adhesive comprises at least two layers of pressure sensitive adhesive, the multilayer adhesive having a tack on cardboard in a range of from 1 to 7 N/25 mm and/or on glass in a range of from 5 to 13 N/25 mm, when measured according to FTM 9, and at least one of the at least two layers comprises a pressure sensitive adhesive composition including at least one acrylic polymer which has a reactive group capable of undergoing a crosslinking reaction, and a crosslinking agent, and wherein the reactive group capable of undergoing a crosslinking reaction is a ketone and the crosslinking agent is a crosslinker with dihydrazide or diamino acid functionality, wherein the interfaces of the at least two layers of the multilayer adhesive are indistinguishable.

11. A method for manufacturing an adhesive label according to claim 1, the method comprising:

arranging a substrate;

coating the substrate with pressure sensitive adhesive so as to form a multilayer adhesive comprising at least two layers, the multilayer adhesive having a tack on cardboard in a range of from 1 to 7 N/25 mm and/or on glass in a range of from 5 to 13 N/25 mm, when measured according to FTM 9; and prior to labelling, cutting the substrate coated with the pressure sensitive adhesive so as to form adhesive labels, wherein at least one of the at least two layers comprises a pressure sensitive adhesive composition including at least one acrylic polymer which has a reactive group capable of undergoing a crosslinking reaction, and a crosslinking agent, and wherein the reactive group capable of undergoing a crosslinking reaction is a ketone and the crosslinking agent is a crosslinker with dihydrazide or diamino acid functionality, wherein the interfaces of the at least two layers of the multilayer adhesive are indistinguishable.

12. The method according to claim 11, further comprising:

arranging a face layer or a release liner as the substrate;

laminating the release liner together with the face layer in such a way that the multilayer adhesive is arranged in between the face layer and the release liner so as to form a label laminate web; and die-cutting the label laminate web so as to form a converted label web, wherein the converted label web comprises the release liner with the adhesive labels attached onto it.

* * * * *